US008024855B2

(12) United States Patent
Gry-Gorowicz et al.

(10) Patent No.: US 8,024,855 B2
(45) Date of Patent: Sep. 27, 2011

(54) CRIMPING DEVICE FOR ELECTRICAL CRIMPING AND SEALED CRIMPING

(75) Inventors: Serge Gry-Gorowicz, GY l'Eveque (FR); Patrick Gauthier, Sennecey le Grand (FR); Flavien Coste, Auxerre (FR)

(73) Assignee: Labinal SA, Montigny-le-Bretonneux (FR)

( * ) Notice: Subject to any disclaimer, the term of this patent is extended or adjusted under 35 U.S.C. 154(b) by 478 days.

(21) Appl. No.: 12/293,940

(22) PCT Filed: Mar. 22, 2007

(86) PCT No.: PCT/FR2007/000485

§ 371 (c)(1), (2), (4) Date: Dec. 4, 2008

(87) PCT Pub. No.: WO2007/107653

PCT Pub. Date: Sep. 27, 2007

(65) Prior Publication Data

US 2009/0119909 A1 May 14, 2009

(30) Foreign Application Priority Data

Mar. 22, 2006 (FR) ..................................... 60 02496

(51) Int. Cl.
*B23P 19/00* (2006.01)

(52) U.S. Cl. ................ 29/761; 29/237; 29/751; 29/753; 72/76; 72/402; 72/404

(58) Field of Classification Search .................... 29/761, 29/237, 282, 517, 751, 753; 72/76, 402, 72/404, 409.06, 409.14, 409.16, 416, 473
See application file for complete search history.

(56) References Cited

U.S. PATENT DOCUMENTS

| | | | | |
|---|---|---|---|---|
| 2,985,047 | A | 5/1961 | Van Oort | |
| 4,244,091 | A | 1/1981 | Kimble et al. | |
| 5,038,461 | A * | 8/1991 | Cerda | 29/753 |
| 5,092,152 | A | 3/1992 | Miller et al. | |
| 7,448,243 | B1 * | 11/2008 | Motsenbocker | 72/76 |
| 2006/0019550 | A1 | 1/2006 | Krajewski | |

FOREIGN PATENT DOCUMENTS

| | | | |
|---|---|---|---|
| DE | 32 03 681 | A1 | 8/1983 |
| GB | 1195193 | A | 6/1970 |
| WO | WO 2006/012979 | A1 | 2/2006 |

* cited by examiner

*Primary Examiner* — Thiem Phan
(74) *Attorney, Agent, or Firm* — Arent Fox LLP

(57) ABSTRACT

The invention concerns a device for crimping a contact on a cable end portion, comprising an axial bore (2) and: first means for crimping (3) the contact on one stripped part of the cable and second means for crimping (4) the contact on one sheathed part of the cable, said means being mobile between a spaced apart position and a crimping position; first and second means for moving (6, 17) said first and second crimping means (3,4) between their spaced apart position and their crimping position; the first displacement means (6) being actuatable in translation along an axial direction and the second displacement means (17) being actuatable in rotation about the axis of the bore (2).

14 Claims, 4 Drawing Sheets

CRIMPING DEVICE FOR ELECTRICAL CRIMPING AND SEALED CRIMPING

CROSS-REFERENCE TO RELATED APPLICATION

This application is a National Stage entry of International Application No. PCT/FR2007/000485, filed Mar. 22, 2007, which claims priority to French Application No. 06/2496, filed Mar. 22, 2006, the disclosure of the prior applications being hereby incorporated in their entireties by reference.

The present invention relates to a device for crimping a contact on an end portion of a cable.

BACKGROUND OF THE INVENTION

To associate a contact with the end of a cable, it is known to crimp a contact upon the end portion of the cable in order to make an electric connection of the cable with the contact. Then, it is provided to crimp the contact on a stripped part of the end portion of the cable, i.e. on the core of the cable. Such crimping operation is called an "electric crimping".

For certain cables, more particularly those, the core of which is made up of aluminium, making a second crimping of the contact on the end portion of the cable on a part where the sheath is present can also be provided. As a matter of fact, in the case of a cable, the core of which is made of aluminium, an oxidation of the core may occur when in contact with air or moisture which may affect the efficiency of the electric contact because of the creation of resistive materials such as alumina during the oxidation reaction. Then, the crimping of the contact on the cable sheath also called a "sealing crimping" is also provided in order to prevent the penetration of air or moisture to the stripped core of the cable.

Both crimping operations may be carried out using a unique tool making it possible to crimp on the one hand the contact on the stripped core of the cable and on the other hand the contact on the sheath of the cable. Document WO-2006/012979 more particularly describes such a unique tool.

In the embodiments of the prior art, the tool is a hand tool of the pliers type comprising crimping means rotatingly operated about the contact and the end portion of the cable. The crimping means are separated into first crimping means making it possible to carry out the electric crimping and second crimping means making it possible to carry out the sealing crimping. Such a tool makes it possible to carry out both crimpings in one operation.

However, the simultaneous activation in rotation of the first and second crimping means implies the deployment of a very important effort from the tool operator, which makes the tool not very practical to use. More particularly, the energy curve of the effort applied by the crimping means shows a high peak of energy during the rotation motion which reduces the lifetime of the tool because of the premature wearing resulting from such peak of energy.

SUMMARY OF THE INVENTION

The invention aims at remedying such drawback by providing a device for crimping a contact on an end portion of a cable making it possible to carry out the electric crimping and the sealing crimping using first and second crimping means, the first crimping means being operated in translation and not in rotation.

For this purpose, the invention relates to a device for crimping a contact on an end portion of a cable, said cable comprising a core and a sheath surrounding said core, said end portion of the cable comprising a stripped part showing the core of the cable, the contact being positioned about said end portion so as to cover the stripped part and a part provided with the sheath, said device comprising an axial bore allowing the introduction of the cable and of the contact positioned about the end portion, said device further comprising:

- first means for crimping the contact on the stripped part and second means for crimping the contact on the part provided with the sheath, said crimping means being positioned about the bore and being movable along a radial direction with respect to the bore between a distant position and upon the introduction of the cable and the contact into the bore and a crimping position wherein the crimping means are intended to apply a pressure on the contact so as to make the crimping;
- first and second means respectively, for moving said first and second crimping means between their distant position and their crimping position, said first and second moving means being each provided with at least one cam cooperating with the crimping means so as to move them in the radial direction;
- means for actuating said moving means;

the first moving means being actuated in translation in an axial direction and the second moving means being rotatingly actuated about the axis of the bore so as to move the first and second crimping means in the radial direction between their distant position and their crimping position.

The fact that the first crimping means are actuated in axial translation makes it possible to smooth the energy curve developed during the utilisation of the tool and thus to eliminate the peak of energy required for carrying out both crimping operations. Thus, the tool has an extended lifetime and is more resistant to wear. In addition, the effort to be developed for carrying out the crimping operations is less important, which makes it possible to save energy.

According to one embodiment, the actuating means are electric means. Thus, the crimping device according to the invention is an electric device and not a manual device which make the utilisation thereof easier for an operator. The latter doesn't have to handle a plier-shaped tool requiring important efforts.

More particularly, the actuating means include for example a first electric motor making it possible to operate the first moving means and a second electric motor making it possible to actuate the second moving means. Using two motors makes it possible to employ less important motors and to limit the overall dimensions of the device and to save energy. In addition, the electric crimping and the sealing crimping may be controlled separately. As a matter of fact, it may be desirable to start with the electric crimping prior to the sealing crimping.

Movable stoppers may be positioned on the axial path of the first moving means and on the rotation path of the second moving means so as to limit the travel thereof.

Thus, the moving of the crimping means may be adapted to the diameter, or gauge, of the cables which are to be crimped upon the adjustment of the device. The device according to the invention is thus a multi-gauge one, contrarily to the source of the prior art when a tool is adapted to a gauge and when a different tool must be provided for each gauge of the cable to be crimped.

Other aspects and advantages of the invention will appear upon reading the following description, while referring to the appended drawings.

DETAILED DESCRIPTION OF THE INVENTION

Figure 1:
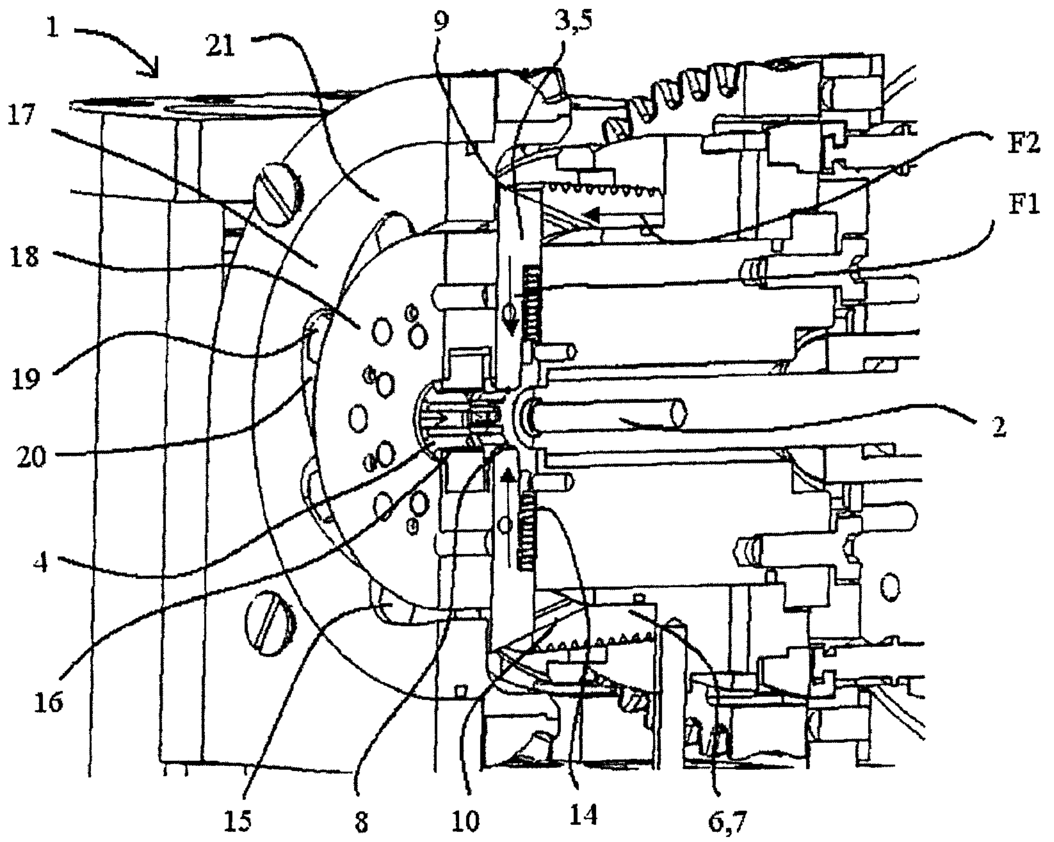
FIG. 1 is a schematic representation in axial section of the crimping device according to the invention, wherein the first and second crimping means are at a distant position.

In the description, the word "axial" is defined with respect to the direction of introduction of the cable into the crimping device, and the word radial is defined with respect to the planes perpendicular to said axial direction.

While referring to FIGS. 1 to 4, the crimping device 1 of a contact (not shown) on the end portion of a cable (not shown) is described. The end portion of the cable to be crimped includes a stripped part showing the core of the cable. The contact extends about the end portion of the cable and more particularly about the stripped part and a part provided with the sheath.

The crimping device 1 includes an axial bore 2 making it possible to introduce the end portion of the cable to be crimped. The bore 2 may go through the whole device or not.

First crimping means 3 and second crimping means 4 extend about the bore 2, in radial directions and are successively positioned in the axial direction. The first crimping means 3 make it possible to carry out the electric crimping, i.e. the crimping of the contact on the stripped part on the end portion of the cable. The second crimping means 4 make it possible to carry out a sealing crimping, i.e. the crimping of the contact on the part provided with the sheath of the end portion of the electric cable. The end portion of the cable is thus introduced on the second crimping means 4 side, so that the stripped part surrounded by the contact is positioned between the first crimping means 3 and that the part provided with the sheath is positioned between the second crimping means 4.

The first crimping means 3 include a plurality of punches 5 which are movable in translation in the radial direction between a distant position (FIG. 1) making it possible to introduce the cable and the contact into the bore 2 and a crimping position (FIG. 2) wherein the crimping means 3 are intended to apply pressure on the contact so as to carry out the crimping by crushing said contact against the stripped part of the end portion of the cable. Such translation motion is shown by the arrows F1 in FIGS. 1 and 2. According to the embodiment shown, the first crimping means 3 include four punches 5 positioned so as to form substantially an angle 90° between two successive punches 5 in the radial plane. The punches 5 include a crimping surface 8 positioned opposite the bore 2. Such crimping surface 8 is so arranged as to apply the pressure on the contact prior to carrying out the crimping operation. The punches 5 are for example guided in translation between guides (not shown) positioned on either side of the end part of punches 5, close to the bore 2.

The first crimping means 3 are associated with first moving means 6, making it possible to move crimping means 3 between their distant position and their crimping position. The first moving means 6 are movable in translation in the axial direction as shown by the arrow F2 in FIGS. 1 and 2.

Figure 2:
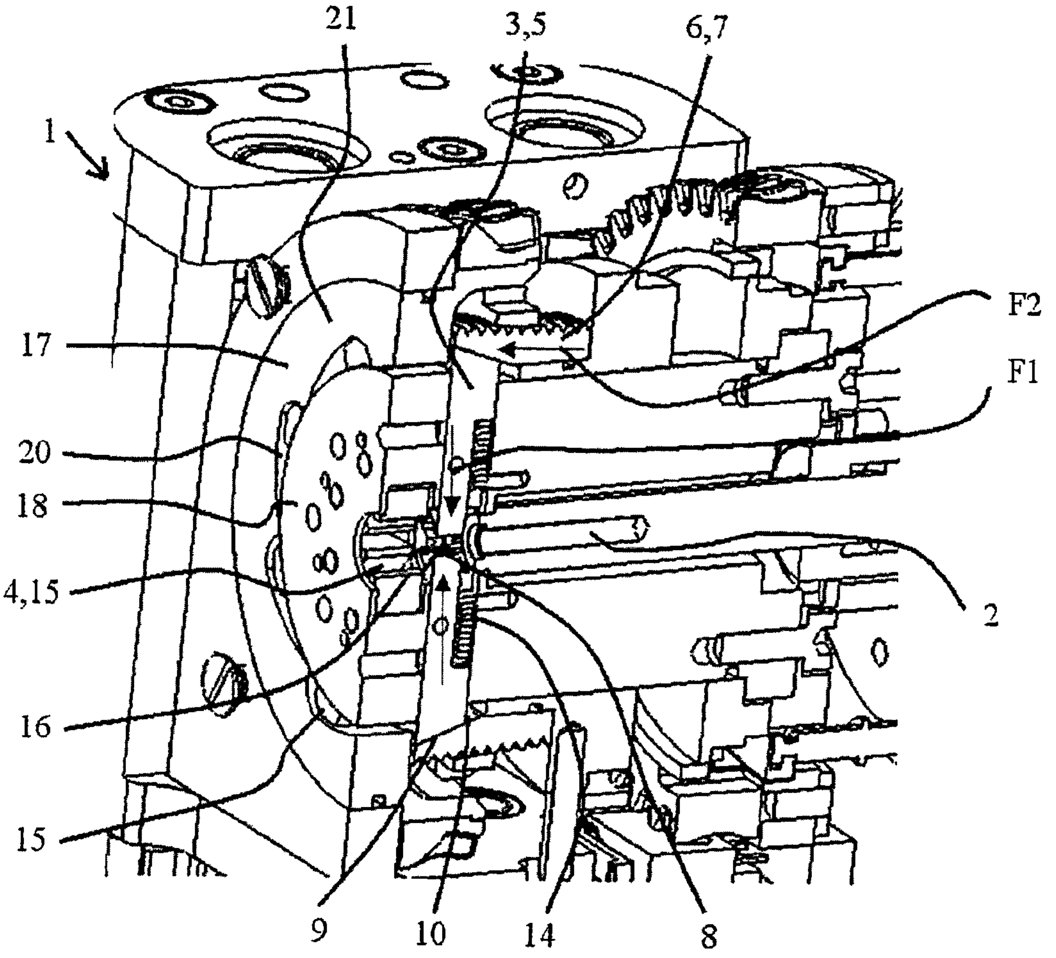
FIG. 2 is a schematic representation in axial section of the device of FIG. 1, wherein the first crimping means are in a crimping position.

According to the embodiment shown in the figures, the first moving means 6 include a ring 7 positioned partly about the punches 5. In order to provide for the progressive moving of the punches 5 towards the crimping position thereof, these include an inclined surface 9 in the axial direction positioned opposite the crimping surface 8 in the radial direction. The ring 7 has an internal wall provided with inclined surfaces 10 forming a cam of the first moving means 3. Such inclined surfaces 10 are each matching the inclined surface 9 of a punch 5. Thus, during the moving in axial translation of the ring 7, the inclined surfaces 10 of the ring 7 come into contact with each inclined surface 9 of the punches 5 and the ring 7 moves the punches from their distant position to their crimping position as can be seen in FIGS. 1 and 2.

In order to provide the moving in axial translation of the ring 7, the latter is operated with an endless screw (not shown), and means for transforming the rotation motion of the endless screw into a translation motion of the ring 7 are provided between said endless screw and said ring. The operation of the screw is controlled by electric actuating means, for example a motor (not shown).

To provide for the return of the punches 5 from their distant position when the first moving means 6 are separated from the punches, the latter may be associated with return means 14 such as springs, so arranged as to move the punches 5 in the radial direction upon the passage from the crimping position to the distant position.

A movable stopper (not shown) may be positioned on the axial path of the first moving means 6 in order to limit the travel thereof. Then, the moving distance of the punches 5 may be adjusted upon the calibration of the device 1 for example and the crimping position can be defined according to the gauge of the end portion of the cable to be crimped. In addition, the position of the stopper may be adjusted in order to compensate for the wear of the punches by providing a longer travel than that initially provided if the punches are worn.

The second crimping means 4 comprise a plurality of punches 15 which are movable in translation in a radial direction between a distant position (FIGS. 1 and 2) making it possible to introduce the cable and the contact into the bore 2, and a crimping position (FIG. 4) wherein the crimping means 4 are intended to apply a pressure on the contact so as to carry out the crimping by crushing said contact against the part provided with a sheath of the end portion of the cable. Such translation motion is shown by the arrows F3 in FIGS. 3 and 4. According to the embodiment shown, the second crimping means 4 include eight punches 15 positioned so as to form substantially an angle of 45° between two successive punches 15 in the radial plane. The punches 15 include a crimping surface 16 positioned opposite the bore 2. Such crimping surface 16 is so arranged as to apply a pressure on the contact in order to carry out the crimping. The crimping surface 16 is curved and the radius of curvature of such crimping surface 16 is greater than the radius of the biggest cable that the device will crimp. Then, the material of the contact is prevented from leaking through the punches 15 during the crimping operation and from forming protrusions about the contact. As a matter of fact, such protrusions are fragile and may get loose which might pollute the cable environment and affect the efficiency of the contact. The punches 15 are mounted on a disc 18 radially punched to allow the passage of each punch 15. The disc makes it possible to guide the translation motion of the punches 15.

The second crimping means 4 are associated with the second moving means 17 making it possible to move the crimping means 4 between their distant position and their crimping position. The second moving means 17 are movable in rotation about the axis of the bore 2 as shown by the arrow F4 in FIGS. 3 and 4.

Figure 3:
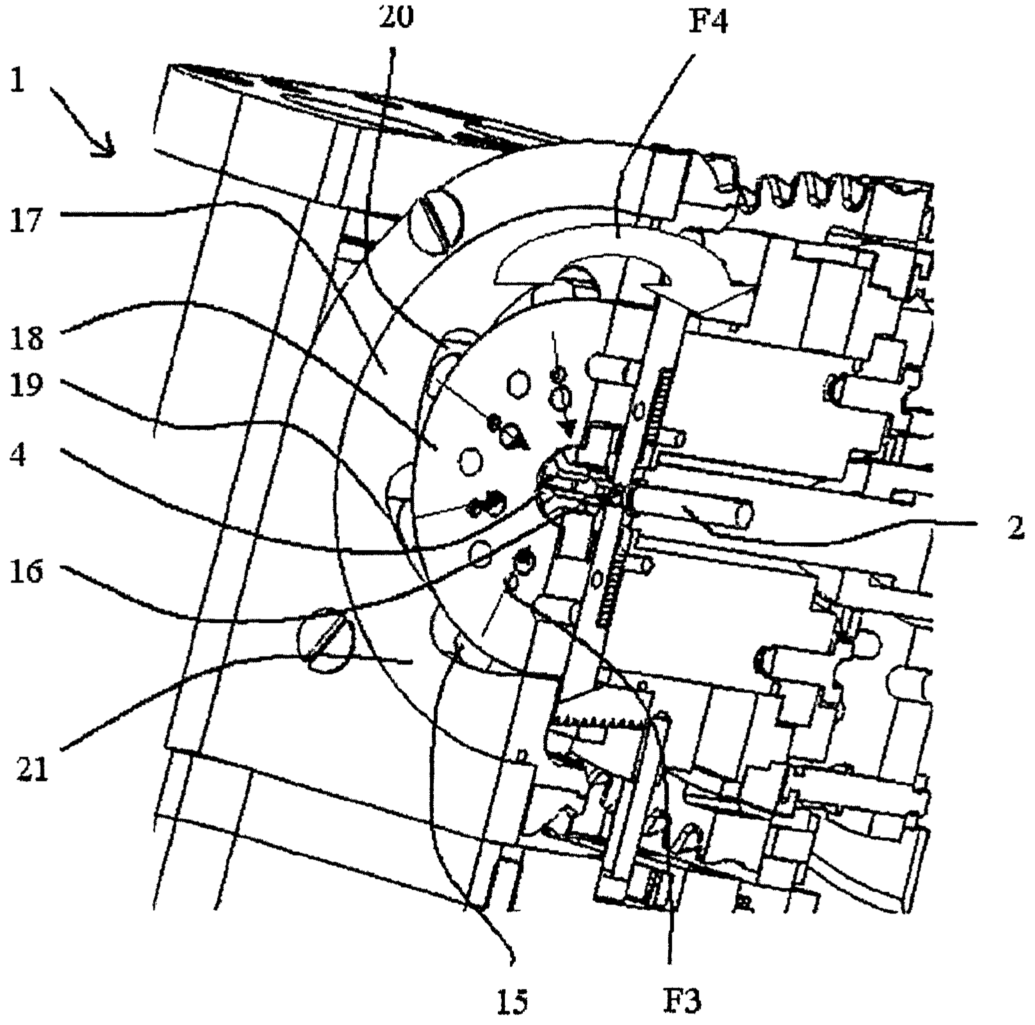
FIG. 3 is a schematic representation in a partial axial section of the device of FIG. 1, wherein the second crimping means are in an intermediate position between the distant position and the crimping position thereof.
Figure 4:
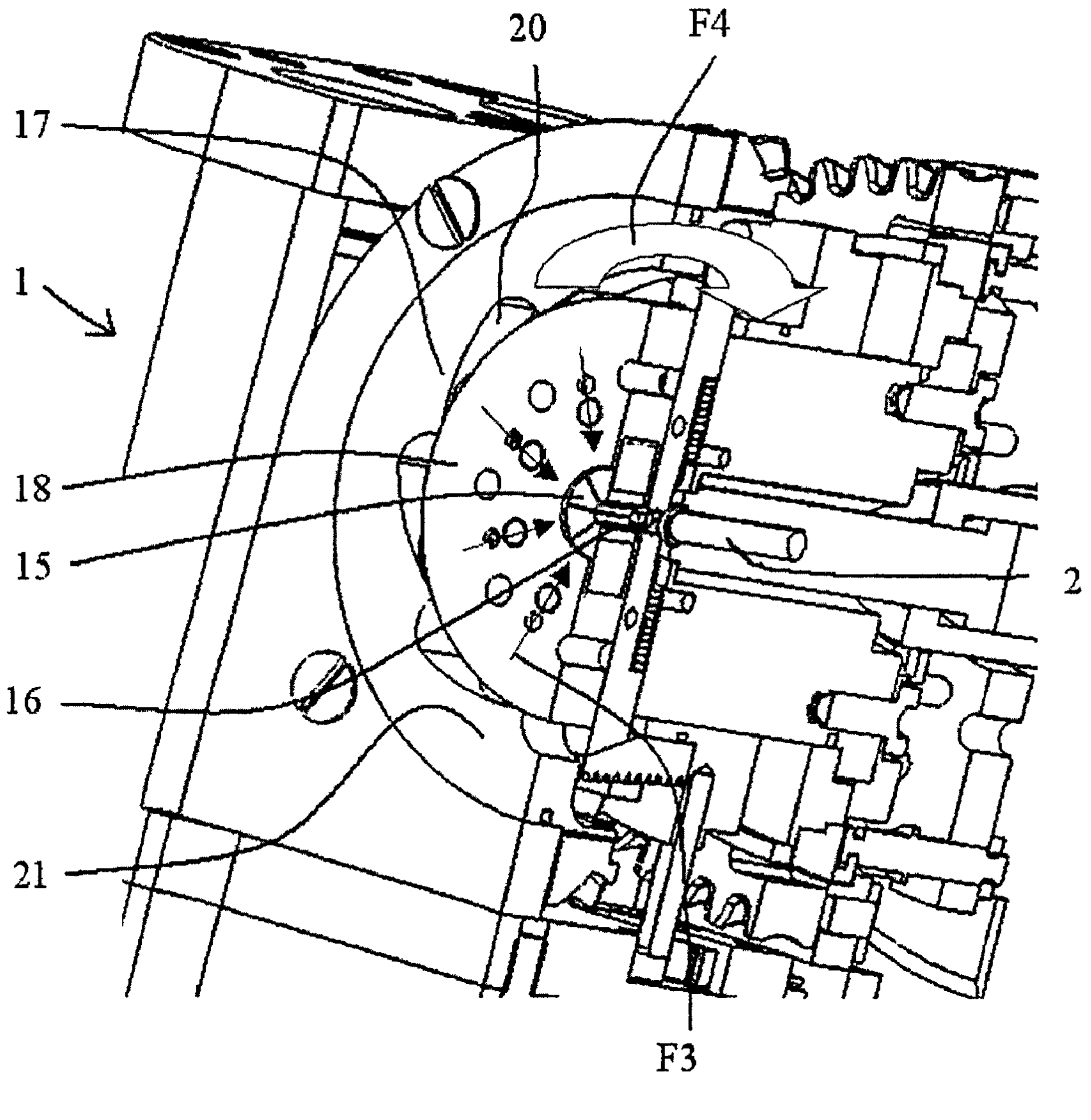
FIG. 4 is a schematic representation in a partial axial section of the device of FIG. 1, wherein the second crimping means are in a crimping position.

According to the embodiment shown in the figures, the second moving means 17 include a cam 21 in the form of a crown rotatingly mounted about the punches 15. The punches 15 are each provided with a rounded cam surface 19 opposite the crimping surface 16 in the radial direction. Such rounded cam surfaces 19 are each received in a recess 20 of the cam 21 and positioned to rest against an internal wall of said recess. The internal wall is curved and has a decreasing diameter so as to progressively move the punches between their distant position and their crimping position upon the rotation of the cam from the distant position to the crimping position as can be seen in FIGS. 3 and 4.

The actuation in rotation of the cam 21 is controlled by electric actuating means, for example a motor (not shown).

The motors controlling the rotation on the second moving means 17 and the translation of the first moving means 6 may be further controlled so that the operation of the motor controlling the actuation of the first moving means is started prior to that of the motor controlling the actuation of the second moving means. Other servo-controls of the motor may be considered, such as a simultaneous starting of the motors.

To provide for the return of the punches 15 from their distant position when the second moving means 17 are separated from the punches, the latter may be associated with return means (not shown) such as springs so arranged as to move the punches 15 in the radial direction upon the passage from the crimping position to the distant position. Such return means are for example mounted in the disc 18.

A movable stopper (not shown), may be positioned on the rotation path of the second moving means 17 in order to limit the travel thereof. Then, the moving distance of the punches 15, and the crimping position may be defined according to the gauge of the end portion of the cable to be crimped may be adjusted upon the calibration of the device 1 for example. In addition, the position of the stopper may be adjusted in order to compensate for the wear of punches by providing a longer travel than that initially provided if the punches are worn.

According to one embodiment, means (not shown) may be provided for measuring the crimping efforts upon the crimping of the end portion of the cable. The measure may then be compared with a gauge showing the expected crimping effort for a certain cable gauge. If the efforts measured are more important than this gauge, it will be obvious that the adjustment of the device, more particularly the stoppers provided on the axial path and on the rotation path of the first and second moving means is not correct. The gauge may be associated with a step of validating the contact gauge, upon the adjustment of the device 1. When the operator uses the device 1, he/she adjusts the gauge, which indicates the gauge of the expected efforts corresponding to this gauge.

The invention claimed is:

1. A device for crimping a contact on an end portion of a cable, the cable comprising a core and a sheath surrounding the core, the end portion of said cable comprising a stripped part showing the core of the cable, with the contact being positioned about said end portion so as to cover the stripped part and a part provided with the sheath, said device comprising an axial bore enabling the introduction of said cable and of said contact positioned about the end portion, said device further comprising:

first crimping means for crimping the contact on the stripped part and second crimping means for crimping the contact on the part provided with said sheath, the crimping means being positioned about said bore and being movable in a radial direction with respect to said bore between a distant position enabling the introduction of the cable and of the contact into said bore and a crimping position, wherein said crimping means are intended to apply a pressure onto the contact so as to carry out the crimping operation;

first and second moving means respectively, for moving said first and second crimping means between their distant position and their crimping position, the first and second moving means being, each, provided with at least one cam cooperating with said crimping means so as to move them in the radial direction;

means for actuating such moving means;

wherein the first moving means can be actuated in translation in an axial direction and the second moving means can be activated in rotation about the axis of said bore so as to move said first and second crimping means in the radial direction between their distant position and their crimping position.

2. The crimping device according to claim 1, wherein the actuating means are electric means.

3. The crimping device according to claim 2, wherein the actuating means include a first electric motor making it possible to actuate the first moving means and a second electric motor making it possible to actuate the second moving means.

4. The crimping device according to claim 1, wherein a movable stopper is positioned on the axial path of the first moving means so as to limit the travel of said means.

5. The crimping device according to claim 1, wherein a movable stopper is placed on the rotation path of the second moving means in order to limit the travel of said means.

6. The crimping device according to claim 1, wherein the first crimping means include a plurality of punches each having a crimping surface and an inclined surface in the axial direction opposite the crimping surface in the radial direction, the first moving means including a ring having an internal wall provided with inclined surfaces, forming the cam of said first moving means, the inclined surfaces being each matching the inclined surface of a punch, the ring being movable in translation in the axial direction so that said inclined surfaces of said ring contact the inclined surfaces of such punches and cause the moving of said punches in the radial direction upon the passage of the first crimping means from the distant position to the crimping position.

7. The crimping device according to claim 6, wherein return means are associated with the punches of the first crimping means in order to move said punches in the radial direction upon the passage from the crimping position to the distant position.

8. The crimping device according to claim 7, wherein the ring is activated using an endless screw, with means for transforming the rotation motion of the endless screw into a translation motion of said ring being provided between said ring and said endless screw.

9. The crimping device according to claim 6, wherein the ring is activated using an endless screw, with means for transforming the rotation motion of the endless screw into a translation motion of said ring being provided between said ring and said endless screw.

10. The crimping device according to claim 1, wherein the second crimping means include a plurality of punches each having a crimping surface and a rounded cam surface opposite said crimping surface in the radial direction, the second moving means comprising a cam mounted to rotate about said punches, the cam being provided with recesses each receiving a cam surface of a punch, the recesses being provided with a curved internal wall resting against said cam surface, said wall having a decreasing diameter so as to move said punches between their distant position and their crimping position upon the rotation of said cam between the distant position and the crimping position.

11. The crimping device according to claim 10, wherein the crimping surface of the punches is curved, the radius of curvature of said crimping surface being greater than the radius of the cable to be crimped.

12. The crimping device according to claim 11, wherein return means are associated with the punches of the second crimping means so as to move said punches in the radial direction upon the passage from the crimping position to the distant position.

13. The crimping device according to claim 10, wherein return means are associated with the punches of the second crimping means so as to move said punches in the radial direction upon the passage from the crimping position to the distant position.

14. The crimping device according to claim 10, characterised in that the second crimping means include eight punches positioned so as to form substantially an angle 45° between two successive punches.

* * * * *

UNITED STATES PATENT AND TRADEMARK OFFICE

CERTIFICATE OF CORRECTION

PATENT NO. : 8,024,855 B2
APPLICATION NO. : 12/293940
DATED : September 27, 2011
INVENTOR(S) : Serge Gry-Gorowicz et al.

It is certified that error appears in the above-identified patent and that said Letters Patent is hereby corrected as shown below:

On the Title Page

Amend On Title Page:

(30) Mar. 22, 2006 (FR)..................................06/2496

Signed and Sealed this
Thirteenth Day of December, 2011

David J. Kappos
*Director of the United States Patent and Trademark Office*